United States Patent [19]

Gras

[11] 4,256,788

[45] Mar. 17, 1981

[54] PROCESS FOR THE COATING OF GLASS SURFACES

[75] Inventor: Rainer Gras, Herne, Fed. Rep. of Germany

[73] Assignee: Chemische Werke Huls AG, Marl, Fed. Rep. of Germany

[21] Appl. No.: 947,042

[22] Filed: Sep. 29, 1978

[30] Foreign Application Priority Data

Oct. 13, 1977 [DE] Fed. Rep. of Germany ....... 2746017

[51] Int. Cl.$^3$ .................. B05D 1/38; B32B 17/10; B65D 25/34

[52] U.S. Cl. .................. 428/35; 215/DIG. 6; 427/333; 427/379; 427/387; 428/339; 428/420; 428/425.5; 428/429

[58] Field of Search .............. 427/333, 379, 387; 428/35, 420, 425, 429, 339, 425.5; 215/DIG. 6

[56] References Cited

U.S. PATENT DOCUMENTS

| | | | |
|---|---|---|---|
| 3,585,103 | 6/1971 | Thomson | 427/387 X |
| 3,779,794 | 12/1973 | De Santis | 156/329 X |
| 3,823,032 | 7/1974 | Ukai | 215/DIG. 6 X |
| 3,889,031 | 6/1975 | Tatsumi et al. | 215/DIG. 6 X |
| 3,926,875 | 12/1975 | Tsugukuni et al. | 260/23 TN |
| 4,015,044 | 3/1977 | Ranney et al. | 428/429 X |
| 4,053,076 | 10/1977 | Vogel et al. | 428/35 X |
| 4,056,208 | 11/1977 | Prejean | 428/35 X |
| 4,093,759 | 6/1978 | Otsuki et al. | 428/35 |
| 4,096,291 | 6/1978 | Dunwald et al. | 427/120 |
| 4,099,638 | 7/1978 | Tatsumi et al. | 428/35 X |
| 4,118,540 | 10/1978 | Amort et al. | 427/387 X |
| 4,130,677 | 12/1978 | Huntsberger | 427/379 |
| 4,143,181 | 3/1979 | Cahn et al. | 428/35 X |

*Primary Examiner*—James R. Hoffman
*Attorney, Agent, or Firm*—Oblon, Fisher, Spivak, McClelland & Maier

[57] ABSTRACT

A process for the coating of glass surfaces with a transparent, duroplastic protective layer of more than 50 microns which comprises first treating the clean glass surface with an aqueous or alcoholic silane skim coat, drying the treated surface and then coating the dry surface with a paste of aliphatic or cycloaliphatic diisocyanates or mixtures thereof or the reaction products with water in the mole ratio of 2:≦1 and a mixture of hydroxy-group-containing compounds consisting of 40-80 wt. %, trifunctional, hydroxy-group-containing polyester polyols made of aliphatic or cycloaliphatic dicarboxylic acids or mixtures thereof and a mixture of triols, diols or tricarboxylic acids, with an average molecular weight of 300 to 1400, 15-50 wt. % bifunctional, hydroxy-group-containing polyester polyols from aliphatic or cycloaliphatic dicarboxylic acids or mixtures thereof and diols, with an average molecular weight of 400 to 2000 and, if necessary, 2.5-25 wt. % aliphatic or cycloaliphatic diols or mixtures thereof, with respect to the total quantity of polyols, and optionally hardening the coated surface with further added heat.

18 Claims, No Drawings

PROCESS FOR THE COATING OF GLASS SURFACES

BACKGROUND OF THE INVENTION

1. Field of the Invention

The present invention deals with the coating of glass surfaces, especially glass bottles with a duroplastic polyisocyanate-polyol containing paste.

2. Description of the Prior Art

The coating of glass surfaces, especially glass bottles, with a very adhesive, uniform and transparent layer of plastic makes bottles extremely safe when they are used for carbonated beverages, such as beer, Cola drinks, mineral water, fruit-juice drinks etc. and in the case of returnable bottles, prolongs their usage. Because of blows and bumps, but also through the effect of heating in sunlight or by other heat sources, there have, in the past, frequently been explosions of unprotected bottles which have caused injuries of varying severity, especially eye injuries, in humans.

Some of the previously known coatings for this purpose have the disadvantage that after repeated cleaning, the coating layer starts to cloud which, in the case of thermoplastic materials, may possibly be the result of an after-crystallization effect of the plastic. Such bottles optically also make a negative impression and from the point of view of sales psychology, are also undesirable. The disadvantage of duroplastic, ether-group-containing synthetic coatings if the rather low tearing strength and the oxidative susceptibility which results in an embrittlement of the protective layer, and thus, especially in the case of returnable bottles, after some time, no longer guarantees protection against shattering.

SUMMARY OF THE INVENTION

It has now been found that one can coat glass surfaces without these and other disadvantages if the process for the coating of glass surfaces, especially glass bottles, for preventing the strewing of glass particles in the case of bursting, with a transparent, duroplastic protective layer of more than 50 microns by applying a paste of polyisocyanates and hydroxyl-group-containing compounds as well as customary processing additives and for the hardening of the coating at higher temperatures is carried out in such a way that at first the clean glass surface is treated with an aqueous or alcoholic silane skim coat, then dried and the glass surface that was treated in such a way is then coated with a paste of aliphatic and/or cycloaliphatic diisocyanates or their reaction products with water in a mole ratio of 2:≦1 and a mixture of hydroxyl-group-containing compounds consisting of 40–80 weight-%, preferably 50–75 weight-%, trifunctional, hydroxyl-group-containing polyester polyols consisting of aliphatic and/or cycloaliphatic dicarboxylic acids and a mixture of triols or tricarboxylic acids and diols, with an average molecular weight of 300 to 1 400, preferably 500 to 800;

15–50 weight-%, preferably 20–40 weight-%, bifunctional, hydroxyl-group-containing polyester polyols consisting of aliphatic and/or cycloaliphatic dicarboxylic acids and diols with an average molecular weight of 400 to 2 000, preferably 500 to 1 200, and if necessary 2.5–25 weight-%, preferably 5–15 weight-% aliphatic and/or cycloaliphatic diols, with respect to the total quantity of the polyester polyols.

and hardened, if necessary with more added heat.

DETAILED DESCRIPTION OF THE PREFERRED EMBODIMENTS

The plastic protective layer that was applied in this way is highly elastic with good tearing strength and exhibits excellent adhesive qualities so that when the glass breaks or the bottle bursts, the glass fragments remain within the protective layer. After the glass bottle is destroyed, the shape of the bottle is completely maintained. The appearing kinetic energy is converted by stretching and heating of the synthetic coating.

The durability of the coating is especially advantageous in regard to hot, alkali-containing washing liquids in which the bottles are cleaned before the beverages are filled into them. This is especially true in the case of returnable bottles which, before each filling, are cleaned intensively.

The advantage of the coating according to the invention is the fact that even after repeated rinsing in the hot, alkaline washing liquids, there are no losses of the mechanical characteristic properties and there is no loss of adhesion. Glass bottles that have such a plastic coating may be used without reservations as containers for carbonated beverages, because there is no longer a danger for the human being in the case of breakage or bursting.

When being used as a returnable bottle, the duration of usage of a coated bottle is significantly longer than that of uncoated bottles which because of the processing through rubbing against sharp edges and washing in hot liquids are severely stressed in regard to the surface or even slightly damaged. In order to carry out this process, the cleaned glass surface, for example, of a glass bottle, is first treated with an aqueous or alcoholic silane skim coat. For this treatment, silanes are used with residues which have two different correlated functional groups. These are, on the one hand, lower alkoxy-residues, especially methoxy-and ethoxy-residues which react with the OH-groups of the glass surface, and, on the other hand, organic residues with such functional groups that can react with the isocyanate groups, such as amino-, epoxi-, mercapto-groups etc., for example, γ-aminopropyltrimethoxysilane, γ-aminopropyl-triethoxy-silane, glycidyloxypropyltriethoxy-silane, glycidyloxypropyl-trimethoxy-silane, γ-mercaptopropyl-trimethoxy-silane, γ-mercaptopropyl-triethoxy-silane etc. The treatment of the glass surfaces can take place, for example, by immersion or spraying with the skimming coat medium. The treated glass surfaces may either be dried separately at 25° to 100° C., or the drying is carried out by means of the heating of the glass surfaces to 80° to 100° C., i.e., to a temperature as it occurs in glass manufacturing during the cooling process.

The application of the solvent-free PUR-two-component-coating pastes described in the following to the pretreated, preheated glass surfaces is carried out according to known processes, such as pouring, spraying, immersion, or similar processes. For reasons of viscosity, the heating of the coating mass to 60°–90° C. is expedient.

After the application of the coating materials, the heat supply may be continued until the complete reaction takes place, if the available heating capacity of the vitreous body should not be sufficient for the hardening itself.

The coated glass surface will then be subjected to the hardening process at a temperature in the range of 160°–240° C., preferably 180°–210° C. For the preparation of the coating, aliphatic and/or cycloaliphatic diisocyanates, for example, are suitable, such as those, for example, described in the article by W. Siefken in Justus Liebig's Annals of Chemistry 562, pages 75–136, such as ethylene diisocyanate-1.2; tetramethylene diisocyanate-1,2; hexamethylene diisocyanate-1.6; 2.2.4- or 2.4.4-trimethyl-hexamethylene diisocyanate-1.6 (TMDI); dodecandiisocyanate-1.12; ω,ω-diisocyanatodipropylether; lysinediisocyanate; cyclobutane-1.3-diisocyanate; cyclohexane-1.3 and -1.4-diisocyanate; 3-isocyanato-methyl-3.5.5-trimethylcyclohexylisocyanate; which is also called isophorondiisocyanate and abbreviated IPDI; decahydro-8-methyl-(1.4-methano-naphthalene-2(or 3) 5-ylendimethylen-diisocyanate; hexahydro-4.7-methano-indan-1 (or 2) 5 (or 6) ylendimethylene-diisocyanate; hexahydro-4.7-methano-indan-1 (or 2) 5 (or 6)-ylen-diisocyanate; hexahydrotoluylene-diisocyanate; perhydro-2.4'- and/or -4.4'-diphenylmethane-diisocyanate; as well as appropriate mixtures of isomers. Other suitable isocyanates are described in the mentioned article in the Annals on Page 122 f. Naturally, mixtures of the isocyanates can also be used. Also suitable are the reactions products of these diisocyanates with water in a mole ratio of 2:≦1, especially those described in DT-OS No. 2 3 41 065.

The conversion of the polyol mixture with the diisocyanate takes place in such quantities that there are 0.8–1.2, preferably 0.95–1.1 isocyanate groups for 1 OH-group.

Suitable for the preparation of the solvent-free PUR-two-component coatings are especially mixtures of tri-functional and bifunctional, hydroxy-group-containing polyester polyols consisting of aliphatic and/or cycloaliphatic dicarboxylic acids or their functional derivatives, such as esters, anhydrides, halides etc., in which case, the expressions tri- or bi-functional polyester polyols are such with 3 or 2 OH-groups. The molecular weight of the polyester polyols should be in the indicated range. The preparation of the polyester polyols can be carried out according to known processes, by converting triols or diols with the aliphatic and/or cycloaliphatic dicarboxylic acids or their functional derivatives by heating with or without catalyst. Suitable triols are, for example, glycerin, trimethylolpropane (TMP), trimethylolethane, triethanolamine and similar substances. Examples for suitable diols will be indicated below. Instead of the mentioned triols, tricarboxylic acids or their functional derivatives may also be used to achieve the trifunctionality.

Suitable aliphatic dicarboxylic acids are the acids that can be derived from the general formula HOOC—(CH$_2$)$_n$—COOH in which n=4–12 and the hydrogen atoms of the methylene groups may be partly substituted by C$_1$–C$_3$-alkyls, such as adipic acid, azelaic acid, sebacic acid, decanedicarboxylic acid, dodecanedicarboxylic acid, 2.2.4- or 2.4.4-trimethyladipic adic and others.

Among the suitable cycloaliphatic dicarboxylic acids, single- unsaturated one should also be mentioned, such as hexahydrophthalic acid, 4-methylhexahydrophthalic acid, tetrahydrophthalic acid, 4-methyl-tetrahydrophthalic acid, 1.3- or 1.4-cyclohexanedicarboxylic acid.

The triols that are suitable for the preparation of the trifunctional polyester polyols are described above. The suitable diols for the preparation of the bifunctional polyester polyols are listed below.

The low-molecular, aliphatic and/or cycloaliphatic diols, which are used as the third polyol component in the process according to the invention, are those with a molecular weight of about 60 to 250 for example, ethylene glycol; 1.2-propylene-glycol; 1.3-propylene glycol; butanediol-1.3; butanediol-1,4; pentanediol-1.5; 2- or 3-methylpentandiol-1.5, neopentylglycol; hexanediol-1.6; 1.4-cyclohexanediol; 1.4-dimethylol-cyclohexane; 2.2-bis-(4-hydroxycyclohexyl)-propane; 2.4.4- or (2.2.4)-trimethylhexanediol-1.6 (TMH-diol); hydroxypivalic acid-neopentyl-glycolester, diethylene-glycol; dipropylene-glycol; triethylene-glycol; tetraethyleneglycol; pentaethylene-glycol or mixtures of these diols. Of these low-molecular, aliphatic diols, hexanediol-1.6; 2.4.4- or 2.2.4)-trimethylhexanediol-1.6 and butanediol-1.4 show the best results.

The dicarboxylic acids and the polyols are used in quantities by selecting the COOH:OH ratio in such a way that the molecular weights of the resulting tri- or bifunctional polyester polyols are within the indicated range.

The average molecular weight of the polyol mixtures used in the process according to the invention, consisting of tri- and bifunctional, hydroxyl-group-containing polyester polyols and low-molecular, aliphatic and/or cycloaliphatic diols, should be between 300 and 800, preferably between 350 and 650. The functionality of the used, above-described polyol mixtures should be between 2 and 3, preferably between 2.4 and 2.9.

A special embodiment of the present process consists of first converting the diisocyanate with the low-molecular aliphatic diols to a prepolymer and then using this together with the mixture of tri- and bifunctional, hydroxy-group-containing polyester polyols according to the invention. The special advantage of this variant of the process is the fact that the coating masses thus obtain a higher viscosity. Also the danger of a run-off of the coating mass from the glass surface to the coated decreases notably.

The conversion of the low-molecular, aliphatic and/or cycloaliphatic diols, especially hexanediol-1,6, butanediol-1.4; 2.4.4-(2.2.4)-trimethylhexanediol-1.6 or the other diols with the aliphatic and/or cycloaliphatic diisocyanates to prepolymer can be carried out according to arbitrary, known methods, as they are, for example, described in "High Polymers" Vol. XVI Polyurethane; Chemistry and Technology I Chemistry by Saunders and Frisch (1962), published by Inter-Science Publishers. In this manner, a prepolymer is obtained in the form of a colorless liquid with an NCO-content in the range of about 15% to about 30%.

The reaction takes place at about 30° to 100° C. for a duration of 3 to 24 hours under practically dry conditions. If necessary, the reaction can be carried out in the presence of a dry inert gas, such as nitrogen.

The reaction between polyisocyanate on one hand and hydroxyl-group-containing polyester and/or diols on the other hand, can be started or accelerated by means of catalysts. The following are suitable: chelate compounds, such as stannic or zinc-octanoate, di-n-butyl stannic dilaurate, di-n-butyl stannic diacetate and others, and tertiary amines, such as 1.4-diazobiccyclooctane-(2.2.2) and others, and their mixtures.

In order to improve the flow characteristics of the coating, so-called flowing agents are added in the preparation. These may be chemical compounds or their mixtures of varying chemical types, for example, polymeric or monomeric compounds, for example, acetals, ether, mixture polymerizates, for example, of n-butylacrylate and vinylisobutylether, silicone resins, fluorinated alkylesters etc. Such flowing agents can be added to the formulations in quantities of 0.05-0.5 weight-%, referred to the overall addition.

The coating mass may also contain customary additives, such as dyes, stabilizers, foam removers, etc. which are soluble in the polyols. These may with reference to the binding agents-polyols, isocyanate-, fluctuate within a wide range. The quantity depends on the requirements in regard to the quality of the coatings.

Before the application of the coating masses, the components A and B are mixed intimately and evacuated individually or jointly until no more bubbles are rising. If necessary, the mixing and degasification process, according to the viscosity, may take place at an increased temperature.

The coating thickness of the hardened coatings, according to the glass surfaces or glass bottles, may fluctuate between 50 and 250 μm.

Having generally described this invention, a further understanding can be obtained by reference to certain specific examples which are provided herein for purposes of illustration only and are not intended to be limiting unless otherwise specified.

Another result of the invention are also the coated glasses, especially glass bottles described according to the above processes.

The mechanical data of PUR-bottle coatings mentioned in the examples were determined according to the following methods:

| Tensile strength elongation $\sigma_{100}$-tension | according to DIN 53 455 |
|---|---|

In addition, test foils were subjected to the following stability tests:
Rinsing lye test: 4 weight-% NaOH, 0.4 weight-% Na-gluconate
1-cycle: 30 minutes/80° C.
Tropical Cond. Test: 70° C./100% rel. air humidity
Sterilization: 121° C./2 h In addition, adhesion and protection against fragmentation were tested. The protection against fragmentation was tested in a so-called drop test. For this purpose, 6.3 g $H_2SO_4$ (98 weight-%) and 9 g $NaHCO_3$ were introduced into a coated 0.7 l beverage bottle and the bottle was closed. The resulting $CO_2$-volume, at 25° C., produces an inside pressure of about 4.0 atm (atmospheric excess pressure). The thus prepared test bottle was dropped from a height of 1.2 m on a concrete plate and the strewing of the glass fragments was observed.

The obtained coatings, on the basis of solent-free PUR-two-component coatings, together with a high stability, also have high elongation values, high tearing strength and good low-temperature characteristics.

DESCRIPTION OF THE STARTING MATERIALS USED IN THE EXAMPLES

1. Components $A_{1-4}$: (hydroxyl-group-containing polyester polyols)

The preparation of the polyester polyols used in the following tests and their characteristic are described below:

The mean molecular weight of the polyesters can be calculated from the analytically determined hydroxyl-number.

Polyester polyol $A_1$: 584 g adipic acid, 312 g neopentylglycol and 236 g hexanediol-1.6 were subjected to esterification. After separation of 8 moles of water, the esterification was continued to an acid number of <1 mg KOH/g with the addition of 0.1 weight-% di-n-butyl stannic oxide.* By applying a vacuum at 180° C. for about 20-30 minutes, a product with a water content of <0.05 weight-% and a hydroxyl number of 105-111 mg KOH/g (theoretically: 114 mg KOH/g) and a viscosity of about 3000 CP was obtained at 25° C.

*(DBTO)

Polyester Polyol $A_2$: In conformity with $A_1$, 365 g adipic acid and 560 g 2.2.4- or 2.4.4-trimethylhexanediol-1.6 were subjected to esterification. Hydroxyl number 120-130 mg KOH/g; acid number <1 mg KOH/g and viscosity at 25° C. about 3000 cP.

Polyester Polyol $A_3$: In conformity with $A_1$, 292 g adipic acid, 104 g neopentylglycol, 118 g hexanediol-1.6 and 134 g 1.1.1-trimethylol-propane were subjected to esterification. Hydroxyl number: 265-285 mg KOH/g, acid number <2 mg KOH/g and viscosity at 25° C. about 5000 cP.

Polyester Polyol $A_4$: In conformity with $A_1$, 219 g adipic acid, 240 g 2.4.4- or (2.2.4)-trimethylhexanediol-1.6 (1:1) and 134 g 1.1.1-trimethylol-propane were subjected to esterification. Hydroxyl number: 290-305 mg KOH/g, acid number <2 mg KOH/g and viscosity at 25° C. about 6500 c).

Component $A_5$: Aliphatic and/or cycloaliphatic diol, as indicated in the examples.

2. Components $B_{1-2}$: (Diisocyanate)

In addition to the monomeric isophorondiisocyanate (Hardener $B_1$), a urea adduct dissolved in isophorondiisocyanate, was also used prepared according to DT-OS No. 23 41 065 and made from IPDI and water, namely the IPDI-Adduct $B_2$: with an NCO-content of 31.5 weight-%, an equivalent weight of 133.3 and a viscosity of 450 cP at 25° C.

Components $B_{3-8}$: (isocyanate-group-containing prepolymers)

Prepolymer $B_3$: To 867.42 parts by weight IPDI, were added 132.48 weight parts hexanediol-1,6 and 0,1 weight parts di-n-butyl-stannic dilaurate and subsequently, stirring took place for 4 hours at 70°-80° C. under dry nitrogen. The obtained reaction mixture had an NCO-content of 22.95%.

Prepolymer $B_4$: To 858.12 parts by weight IPDI, were added 141.78 weight parts 2,4,4- or (2,2,4)-trimethyl-hexanediol-1,6 (1:1) and 0.1 weight parts di-n-butyl-stannic dilaurate and subsequently, stirring took place for 4 hours at 70°-80° C. under dry nitrogen. The obtained reaction mixture had an NCO-content of 24.56%.

Prepolymer B$_5$: To 865.35 parts by weight IPDI, were added 134.55 weight parts butanediol-1,4 and 0.1 weight parts di-n-butyl-stannic dilaurate and subsequently, stirring took place for 4 hours at 70°-80° C. under dry nitrogen. The obtained reaction mixture had an NCO content of 19.81%.

Prepolymer B$_6$: To 850.21 parts by weight IPDI, were added 149.69 weight parts hexanediol-1,6 and 0.1 weight parts di-n-butyl-stannic dilaurate and subsequently, stirring took place for 4 hours at 70°-80° C., under dry nitrogen. The obtained reaction mixture had an NCO-content of 21.21%.

Prepolymer B$_7$: To 838.23 parts by weight IPDI, were added 161.76 parts TMH-diol and 0.1 parts by weight di-n-butyl stannic dilaurate and subsequently, stirring took place for 4 hours at 70°-80° C. under dry nitrogen. The obtained reaction mixture had an NCO-content of 22.83%.

Prepolymer B$_8$: To 862.1 parts by weight IPD, were added 137.8 weight parts butandiol-1.4 and 0.1 weight parts di-n-butyl stannic dilaurate and subsequently, stirring took place for four hours at 70°-80° C. under dry nitrogen. The obtained reaction mixture had an NCO content of 19.53%.

Coating Pastes:

In each of the following examples, the component A, consisting of the tri- and bifunctional polyester polyol and, if necessary, aliphatic and/or cycloaliphatic diol as well as catalyst and flowing agent, is homogenized at 40° to 50° C. in the dissolver and subsequently evacuated long enough, until there is no more rising bubbles. Subsequently, the hardener or the prepolymer-(component B) is added, mixed and again evacuated until it is free of bubbles. At first this coating material was applied to untreated glass plates that were pre-heated to 80°-100° C., in order to prepare foils for the determination of the characteristic mechanical data and for the stability tests, such as rinsing liquid and tropical condition tests, as well as sterilization. For the adhesion and drop tests, glass plates and bottles that had been pre-treated with silane wash (glycidyloxypropyltrimethoxysilane) and preheated to 80°-100° C., were coated.

Table 1 shows examples of characteristic methcnical data of polyol combinations A$_1$+A$_3$ as well as certain diols in connection with IPDI and IPDI-add B$_2$ or IPDI-prepolymers B$_{6-8}$ according to the above description. The OH/NCO ratio was 1:1.

TABLE 1

| Examples | 1 | 2 | 3 | 4 | 5 | 6 | 7 | 8 |
| --- | --- | --- | --- | --- | --- | --- | --- | --- |
| Components A | | | | | | | | |
| Polyester polyol A$_3$ | 400,87 | 343,23 | 381,48 | 379,62 | 393,96 | 391,5 | 367,8 | 366,13 |
| Polyester polyol A$_1$ | 267,24 | 343,23 | 190,74 | 189,81 | 196,98 | 195,75 | 183,9 | 183,06 |
| Hexanediol polyol - 1.6 | — | — | 63,58 | — | — | — | — | — |
| TMH-diol | — | — | — | — | 65,66 | — | — | — |
| Butanediol - 1.4 | — | — | — | — | — | — | 61,3 | — |
| Commercial flowing agent on the basis of alkylesters of perfluorinated carboxylic acids | 0,5 | 0,5 | 1,0 | 2,0 | 1,0 | 2,0 | 1,0 | 2,0 |
| Di-n-butyl stannic dilaurate | 1,0 | 1,0 | 2,0 | 0,5 | 2,0 | 0,5 | 2,0 | 0,5 |
| Components B | | | | | | | | |
| IPDI | — | — | 361,20 | — | 340,40 | — | 384,0 | — |
| IPDI-adduct B$_2$ | 329,89 | 311,54 | — | — | — | — | — | — |
| Prepolymer B$_6$ | — | — | — | 428,07 | — | — | — | — |
| Prepolymer B$_7$ | — | — | — | — | — | 410,25 | — | — |
| Prepolymer B$_8$ | — | — | — | — | — | — | — | 448,31 |
| Mechanical Data | | | | | | | | |
| Tensile Strength N/mm$^2$ | 36,0 | 31,6 | 37,8 | 36,7 | 36,4 | 37,1 | 36,8 | 36,5 |
| Elongation % | 180 | 200 | 195 | 190 | 200 | 195 | 190 | 195 |

The results of the stability tests, such as rinsing liquid, tropical condition and sterilization test are listed in Table 3. The adhesion of the coating masses on pre-treated glass plates and bottles (also after 5 cycles of rinsing liquid test) was excellent. The protection against fragmentation was guaranteed in all examples.

Table 2 shows some further examples with characteristics mechanical data of the polyol combinations consisting of polyester polyol A2 and A4 and, if necessary hexanediol - 1.6, TMH-diol and butanediol - 1.4 in connection with IPDI, IPDI-adduct B$_2$ or prepolymers B$_{3-5}$. The OH/NCO ratio was also at 1:1.

TABLE 2

| Examples | 9 | 10 | 11 | 12 | 13 | 14 | 15 | 16 | 17 | 18 | 19 | 20 |
| --- | --- | --- | --- | --- | --- | --- | --- | --- | --- | --- | --- | --- |
| Components A | | | | | | | | | | | | |
| Polyester A$_4$ | 422,4 | 426,69 | 369,89 | 343,62 | 435,43 | 431,49 | 478,33 | 381,55 | 355,74 | 356,99 | 303,83 | 301,14 |
| Polyester A$_2$ | 120,69 | 121,91 | 184,95 | 171,81 | 124,41 | 125,28 | 127,55 | 190,78 | 177,87 | 178,49 | 243,06 | 240,95 |
| Hexanediol - 1.6 | 60,34 | — | 61,65 | 57,27 | — | — | — | — | — | — | — | — |
| TMH-diol | — | — | — | — | 62,20 | — | 31,89 | 63,59 | 59,29 | — | — | — |
| Butanediol - 1.4 | — | — | — | — | — | — | — | — | — | 59,5 | 60,77 | — |
| Commercial flowing agent on the basis of alkylesters of perfluorinated carboxylic acids | 0,5 | 0,5 | 0,5 | 0,5 | 0,5 | 0,5 | 0,5 | 0,5 | 0,5 | 0,5 | 0,5 | 0,5 |
| Di-n-butyl stannic dilaurate | 1,0 | 2,0 | 1,0 | 1,0 | 1,0 | 2,0 | 1,0 | 1,0 | 1,0 | 1,0 | 1,0 | 2,0 |
| Components B | | | | | | | | | | | | |
| IPDI | 395,07 | — | 382,01 | — | 376,46 | — | 360,73 | 362,58 | — | 403,52 | 390,84 | — |
| IPDI-adduct B$_2$ | — | — | — | 425,80 | — | — | — | — | 405,60 | — | — | — |

TABLE 2-continued

| Examples | 9 | 10 | 11 | 12 | 13 | 14 | 15 | 16 | 17 | 18 | 19 | 20 |
|---|---|---|---|---|---|---|---|---|---|---|---|---|
| Prepolymer B$_3$ | — | 448.9 | — | — | — | — | — | — | — | — | — | — |
| Prepolymer B$_4$ | — | — | — | — | — | 442.73 | — | — | — | — | — | — |
| Prepolymer B$_5$ | — | — | — | — | — | — | — | — | — | — | — | 455.44 |
| Mechanical Data | | | | | | | | | | | | |
| Tensile strength N/mm$^2$ | 39.1 | 38.5 | 41.8 | 38.9 | 38.3 | 38.9 | 39.7 | 39.2 | 40.1 | 37.8 | 41.7 | 40.3 |
| Elongation % | 155 | 160 | 220 | 170 | 170 | 180 | 175 | 205 | 185 | 175 | 195 | 190 |

The results of the stability tests are also listed in Table 3. The adhesion of the coating masses on pretreated glass plates or bottles (also after 5 cycles of rinsing liquid test) was also excellent. The protection against fragmentation was guaranteed in all examples.

Table 3 shows the washing liquid, tropical conditions and sterilization stability of selected examples from Tables 1 and 2.

TABLE 3

| Examples from Tables 1 and 2 | | | 1 | 2 | 3 | 5 | 7 | 11 | 16 | 19 |
|---|---|---|---|---|---|---|---|---|---|---|
| Washing Liquid Test | | | | | | | | | | |
| Before the Test | Tensile strength $\sigma_B$ | N/mm$^2$ | 34.7 | 30.1 | 37.4 | 34.5 | 38.4 | 40.7 | 39.7 | 40.6 |
| | Elongation $\epsilon_B$ | % | 185 | 205 | 192 | 195 | 190 | 215 | 195 | 195 |
| | $\sigma_{100}$ Tension $\sigma_{100}$ | N/mm$^2$ | 14.1 | 10.5 | 13.3 | 12.3 | 21.4 | 19.4 | 18.8 | 20.0 |
| After the Test | After 5th Cycle $\sigma_B$ | N/mm$^2$ | 19.4 | 17.1 | 28.6 | 24.2 | 25.6 | 27.5 | 28.1 | 29.1 |
| | and after 24 h at RT | N/mm$^2$ | 25.1 | 22.7 | 42.3 | 28.3 | 38.9 | 36.9 | 35.3 | 36.7 |
| | After 5th Cycle $\epsilon_B$ | % | 210 | 225 | 200 | 200 | 170 | 205 | 200 | 225 |
| | and after 24 h at RT | % | 190 | 200 | 206 | 175 | 190 | 195 | 185 | 190 |
| | After 5th Cycle $\sigma_{100}$ | N/mm$^2$ | 7.3 | 5.8 | 8.3 | 8.1 | 12.4 | 11.9 | 14.4 | 15.7 |
| | and after 24 h at RT | N/mm$^2$ | 13.1 | 9.9 | 12.4 | 10.5 | 20.1 | 18.7 | 17.6 | 18.1 |
| Tropical Conditions Test | | | | | | | | | | |
| Before the Test | Tensile strength $\sigma_B$ | N/mm$^2$ | 33.5 | 29.7 | 40.4 | 36.3 | 35.9 | 39.8 | 38.7 | 41.0 |
| | Expansion $\epsilon_B$ | % | 175 | 210 | 199 | 190 | 185 | 220 | 215 | 195 |
| | $\sigma_{100}$ Tension $\sigma_{100}$ | N/mm$^2$ | 17.0 | 13.8 | 13.4 | 12.7 | 21 | 18.9 | 17.3 | 19.7 |
| After the Test | $\sigma_B$ After 1st d + 24 h at RT | N/mm$^2$ | 29.1 | 26.7 | 35.7 | 25.8 | 30.2 | 34.8 | 35.5 | 36.5 |
| | $\epsilon_B$ After 1st d + 24 h at RT | % | 180 | 220 | 215 | 185 | 175 | 205 | 200 | 200 |
| | $\sigma_{100}$ After 1st d + 24 h at RT | N/mm$^2$ | 14.3 | 11.9 | 11.7 | 9.8 | 16.6 | 17.1 | 16.4 | 18.1 |
| | $\sigma_B$ After 7th d + 24 h at RT | N/mm$^2$ | 30.0 | 27.1 | 39.8 | 35.3 | 33.3 | 35.1 | 35.9 | 34.5 |
| | $\epsilon_B$ After 7th d + 24 h at RT | % | 200 | 235 | 176 | 220 | 180 | 200 | 190 | 190 |
| | $\sigma_{100}$ After 7th d + 24 h at RT | N/mm$^2$ | 13.8 | 10.7 | 17.2 | 14.7 | 22.1 | 18.5 | 16.1 | 18.7 |
| | $\sigma_B$ After 14th d + 24 h at RT | N/mm$^2$ | 29.8 | 24.3 | 35.6 | 28.4 | 30.9 | 31.7 | 33.9 | 32.6 |
| | $\epsilon_B$ After 14th d + 24 h at RT | % | 175 | 200 | 188 | 185 | 165 | 195 | 185 | 180 |
| | $\sigma_{100}$ After 14th d + 24 h at RT | N/mm$^2$ | 12.9 | 9.9 | 15.9 | 12.3 | 20.4 | 17.7 | 16.5 | 16.7 |
| Sterilization | | | | | | | | | | |
| Weight Increase | | % | 2.7 | 2.9 | 2.1 | 2.3 | 2.0 | 2.4 | 2.3 | 2.4 |

COMPARATIVE EXAMPLE 1

Preparation and application according to the above described examples.

Component A 384.87 weight parts polyether polyol (OH-Z: 108 mg KOH/g) linear
102.68 weight parts polyether polyol (OH-Z: 258 mg KOH/g) linear
102.00 weight parts trimethylolpropane
2.00 weight parts Sn-octanoate
1.00 commercial flowing agent on the basis of alkylesters of perfluorinated carboxylic acid

Component B 407.45 weight parts IPDI

Mechanical Characteristics

Tensile strength: 18.0 N/mm$^2$
Expansion: 10%

No protection against fragmentation is guaranteed, since the expansion as well as the tensile strength are imperfect.

COMPARATIVE EXAMPLE 2

Preparation and application of the coating paste as described above.

Component A 225.12 weight parts polytetramethylene ether glycol (OH-Z: 173.5 mg KOH/g)
262.43 weight parts polytetramethylene ether glycol (OH-Z: 110.5 mg KOH/g)
102.0 weight parts trimethylol propane
2.0 weight parts Sn-octoate
1.0 weight parts flowing agent analogous to comparative example 1

Component B 407.45 weight parts IPDI

Mechanical Characteristics

Tensile strength: 35 N/mm$^2$
Elongation: 160%

In the drop test, slight strewing of glass fragments was observed. In addition, after the hardening process, the foils showed a definite yellow coloring and after 400 accelerated weathering in the Xeno-test, an embrittlement was noticed and after 650 h destruction of the foil.

Having now fully described this invention, it will be apparent to one of ordinary skill in the art that many changes and modifications can be made thereto without departing from the spirit or scope of the invention set-forth herein.

What is claimed as new and intended to be covered by Letters Patent is:

1. A process for the coating of glass surfaces to prevent the strewing of glass particles in case of bursting, with a transparent, duroplastic protective layer of more than 50 microns which comprises
    first treating the clean glass surface with an aqueous or alcoholic silane skim coat,
    drying said treated surface, and then
    coating said dry surface with a paste of aliphatic or cycloaliphatic diisocyanates or mixtures thereof or their reaction products with water in a mole ratio of $2:\leqq 1$ and a mixture of hydroxyl-group-containing compounds consisting of
        40–80 wt.% trifunctional, hydroxyl-group-containing polyester polyols made of aliphatic or cycloaliphatic dicarboxylic acids or mixtures thereof and a mixture of triols, diols or tricarboxylic acids, with an average molecular weight of 300 to 1400,
        15–50 wt.% bifunctional, hydroxy-group-containing polyester polyols from aliphatic or cyloaliphatic dicarboxylic acids or mixtures thereof and diols, with an average molecular weight of 400 to 2000 and, if necessary
        2.5–25 wt.% aliphatic or cycloaliphatic diols or mixtures thereof, with respect to the total quantity of polyols.

2. A process according to claim 1, wherein the trifunctional, hydroxyl-group containing polyester polyol has an average molecular weight of 500 to 800.

3. A process according to claim 1 or 2, wherein the bifunctional, hydroxyl-group-containing polyester-polyol has an average molecular weight of 500 to 1 200.

4. A process according to claim 1, wherein polyester-polyols and diols as well as polyisocyanates are used in such quantities that there are 0.8 to 1.2 isocyanate groups for one OH-group.

5. A process according to claim 4, wherein there are 0.95–1.1 isocyanate groups for one OH-group.

6. A process according to claim 1, wherein a prepolymer from the polyisocyanates and aliphatic diols is first prepared and then used.

7. The process of claim 1 wherein said glass surfaces are glass bottles.

8. Coated glass bottles with a transparent, duroplastic protected layer, manufactured according to claim 7.

9. The process of claim 1 wherein said trifunctional hydroxy-group-containing polyester polyol is present in an amount of 50–75%.

10. The process of claim 1 wherein said bifunctional hydroxy-group-containing polyester polyol is present in an amount of 20–40%.

11. The process of claim 1 wherein said mixture of hydroxy-group-containing compounds contains 2.5–25% by weight of aliphatic or cycloaliphatic diols or mixtures thereof.

12. The process of claim 11 wherein said diols are present in an amount of 5–15%.

13. The process of claim 1 wherein said coated surface is hardened by further heating.

14. A process according to claim 13, wherein the coated glass surfaces are subjected to the hardening at a temperature in the range of 150°–240° C.

15. A process according to claim 14, wherein the hardening is carried out at temperatures in the range of 180°–210° C.

16. The process of claim 1 wherein said silane has at least two functionally correlated groups, one of which will react with said glass surface and the other will react with isocyanate groups.

17. The process of claim 1 wherein said coating paste contains 0.05–0.5 wt.% of a flowing agent.

18. Coated glass surfaces with a transparent, duroplastic protective layer, manufactured according to claim 1.

* * * * *